US005164564A

United States Patent [19]

Umeda

[11] Patent Number: 5,164,564

[45] Date of Patent: Nov. 17, 1992

[54] WELDING ROBOT GUN CONNECTING DEVICE

[75] Inventor: Shigeru Umeda, Tokyo, Japan

[73] Assignee: Obara Corporation, Tokyo, Japan

[21] Appl. No.: 754,760

[22] Filed: Sep. 4, 1991

[30] Foreign Application Priority Data

Jan. 24, 1991 [JP] Japan .................................. 6424[U]

[51] Int. Cl.[5] ........................ B23K 11/10; B23K 11/24

[52] U.S. Cl. .................................................. 219/86.25

[58] Field of Search ................ 219/86.25, 89, 90, 116; 901/42

[56] References Cited

U.S. PATENT DOCUMENTS 5,111,018 5/1992 Nishiwaki et al. .............. 219/86.25

5,113,053 5/1992 Umeda et al. ......................... 901/42

FOREIGN PATENT DOCUMENTS 59-4981 1/1984 Japan ............................... 219/86.25

60-180683 9/1985 Japan ................................. 219/116

*Primary Examiner*—Geoffrey S. Evans

*Attorney, Agent, or Firm*—Flynn, Thiel, Boutell & Tanis

[57] ABSTRACT

The welding robot gun connecting device comprises a cradle having a hollow frame, a connecting plate fixed to a rear plate thereof and a U-shaped connecting member fixed to a tip end of a robot wrist wherein the connecting plate is inserted into and fixed to the U-shaped connecting member by bolts from outside portion of the U-shaped connecting member in order to miniaturize the device and make the fixing operation easier utilizing the hollow frame of the cradle.

4 Claims, 2 Drawing Sheets

WELDING ROBOT GUN CONNECTING DEVICE

CROSS REFERENCE TO RELATED APPLICATION

This application is related to copending U.S. Ser. No. 674,553 now U.S. Pat. No. 5,111,018, which was filed on Mar. 22, 1991 and which has been assigned to the Assignee of this application.

BACKGROUND OF THE INVENTION

1. Field of the Invention

The present invention relates to a welding robot gun connecting device for connecting a cradle of a welding gun to a robot wrist.

2. Description of the Related Art

A conventional welding robot gun connecting device for connecting a welding gun to a robot wrist is illustrated in FIG. 3.

A cradle 25 has a pivoting portion 24 at a front end thereof for pivoting welding gun arms 22 and 23 which are respectively operated to be opened or closed by a pressure cylinder 21 and an electrical transformer 26 connected thereto at a rear end thereof. The electrical transformer 26 has a rear end connected to a robot wrist 28 by way of a connecting bracket 27. The connecting bracket 27 has both ends respectively provided with flanges 29 and 30 to which bolts are attached. The electrical transformer 26 and the bracket 27 are connected to each other by bolts 31 screwed from the flange 29 while the robot wrist 28 and the bracket 27 are connected to each other by bolts 32 screwed from the flange 30.

However, there was a problem that the welding robot gun is disposed at the position remote from the robot wrist since there is defind a gap between the flanges 29 and 30 for the interval corresponding at least to the length of the bolts, i.e., the interval where the bolt 31 can be screwed into the flange 29 and the bolt 32 into the flange 30 when the welding robot gun is connected to the robot wrist by way of the flanges 29 and 30 provided at both ends of the connecting bracket 27.

There was proposed a connecting device for connecting the robot wrist 28 to the cradle 25 as illustrated in FIG. 4 by fixing flanges 33 and 34 to the robot wrist 28 and the cradle 25, and thereafter screwing bolts 35 into both the flanges 33 and 34.

There was another problem in the proposed connecting device that the bolts 35 are disposed at the portion projecting outwardly from the robot wrist 28 and the cradle 25 when both the flanges 33 and 34 are connected by the bolts 35 although the welding robot gun can be disposed close to the robot wrist 28, which involved an increase of the size of both the flanges 33 and 34.

SUMMARY OF THE INVENTION

The present invention has been made to solve the problems of the conventional connecting device and is to provide a small sized connecting device for connecting a robot wrist to a cradle of the welding robot gun while the connecting device is prevented from protruding outward from the robot wrist and the cradle. To achieve the above object, the welding robot gun connecting device of the present invention comprises a cradle having a hollow frame, a pivoting portion at one end thereof for pivotally mounting welding robot gun arms thereon, a connecting plate fixed to a rear plate thereof, a U-shaped connecting member fixed to a tip end of the robot wrist wherein the connecting plate is inserted into and fixed to the U-shaped connecting member by bolts from outside portion of the U-shaped connecting member.

DESCRIPTION OF THE PREFERRED EMBODIMENT

Figure 1:
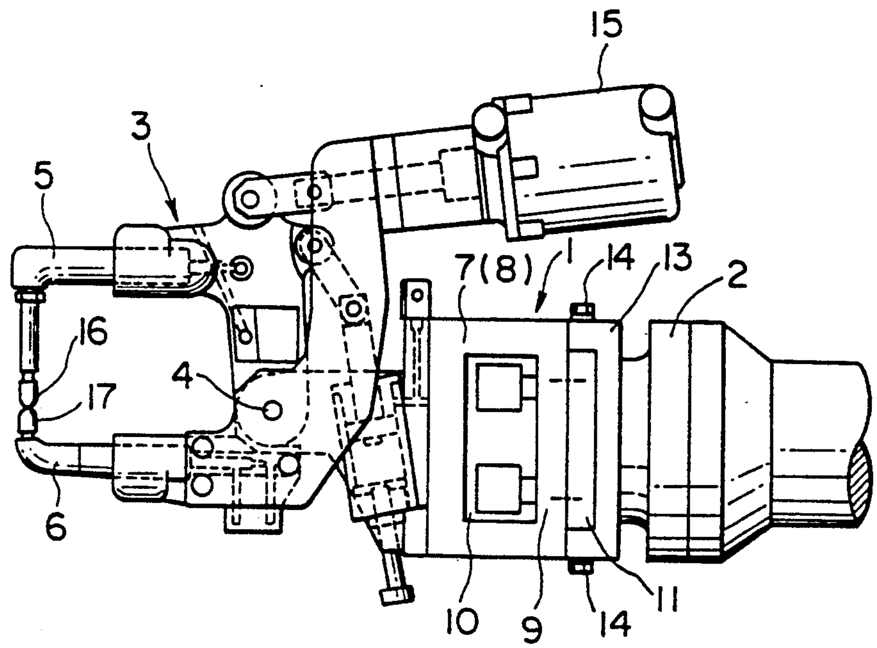
FIG. 1 is a side view showing a welding robot gun employing a connecting device according to the present invention.
Figure 2:
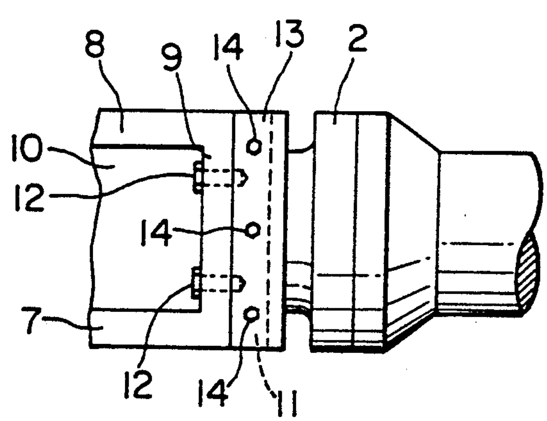
FIG. 2 is a plan view of the welding robot gun in FIG. 1.
Figure 3:
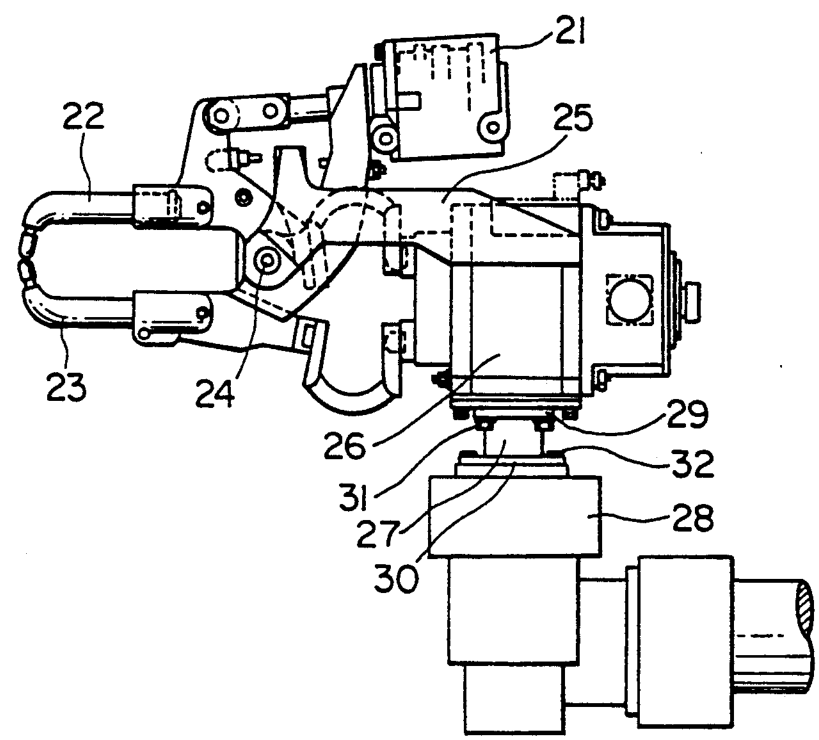
FIG. 3 is a side view of a welding robot gun employing a conventional connecting device.
Figure 4:
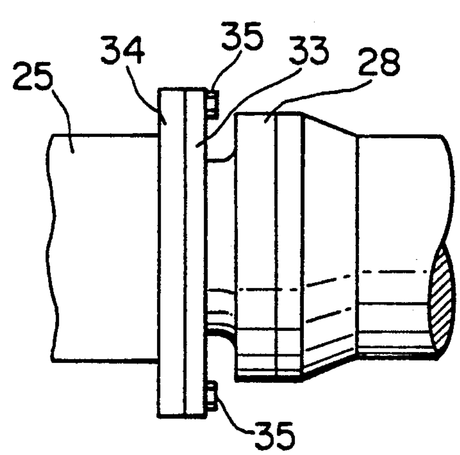
FIG. 4 is a plan view of another known connecting device gun for a welding robot.

A welding robot gun connecting device according to a preferred embodiment of the present invention will be described with reference to FIGS. 1 and 2.

The welding robot gun connecting device comprises a cradle 1 interposed between a robot wrist 2 and a welding robot gun 3. The cradle 1 has a pivoting portion 4 at one end thereof on which portion each arm 5 and 6 of the welding robot gun 3 is pivotally mounted while side plates 7 and 8 and a rear plate 9 form a hollow frame 10.

A connecting plate 11 is connected to a rear surface of the rear plate 9 by bolts 12 extending from the inside of the hollow frame 10. The connecting plate 11 may be connected to the rear surface of the rear plate 9 by welding without using the bolts 12. The connecting plate 11 is structured to have a shorter length than the rear plate 9 so that the upper and lower ends of the connecting plate 11 may be disposed inside the upper and lower ends of the rear plate 9 (FIG. 1). The robot wrist 2 has a U-shaped connecting member 13 at a tip end thereof into which member 13 the connecting plate 11 can be inserted. The connecting member 13 has the panel height as that of the cradle 1.

Bolts 14 are screwed into the connecting plate 11 from the outside of the U-shaped connecting member 13 whereby the robot wrist 2 and the welding robot gun 3 are connected firmly to each other. Arms 5 and 6 of the welding robot gun have electrodes 16 and, 17 provided at the tip ends. The arms 5 and 6 are opened or closed by the operation of a pressure cylinder 15.

With the arrangement of the welding robot gun connecting device according to the present invention, the connecting plate 11 is connected to the rear plate 9 of the cradle and can be fixed to the U-shaped connecting member 13 fixed to the robot wrist with ease by the bolts 14 screwed from the outside of the U-shaped connecting member.

Furthermore, the connecting device is miniaturized as a whole since the connecting device does not protrude outside the robot wrist and the cradle.

Still furthermore, when the connecting plate is fixed to the rear plate of the cradle by bolts, the fixing operation can be made with ease by utilizing the hollow frame.

What is claimed is:

1. A welding robot gun connecting device comprising:

a cradle interposed between a robot wrist and a welding robot gun, the cradle having a pivoting portion at one end thereof and a hollow frame composed of side plates and a rear plates;

said welding robot gun having arms which are pivotally mounted on the pivoting portion;

a connecting plate connected to a rear surface of the rear plate of the hollow frame and having a length smaller than the length of the rear plate of the hollow frame; and a U-shaped connecting member provided at a tip end of the robot wrist, the connecting plate being inserted into the U-shaped connecting member and being connected thereto by bolts.

2. A welding robot gun according to claim 1, wherein the connecting plate is connected to the rear plate by bolts extending from the inside of the hollow frame.

3. A welding robot gun according to claim 2, wherein the connecting plate is connected to the rear plate by welding.

4. In a welding gun assembly, comprising: a robot wrist capable of articulating a tool, a cradle connected at the rear end thereof to said robot wrist and extending forwardly therefrom, said cradle comprising a hollow frame adjacent to the rear end thereof and a pivotal mounting portion adjacent to the forward end thereof, a pair of welding gun arms pivotally mounted on said pivotal mounting portion and projecting forwardly therefrom, said hollow frame comprising a pair of spaced, opposed, parallel side plates and a rear plate extending transversely between the rearward ends of said side plates, a planar connecting plate mounted on and extending parallel with the rear surface of said rear plate of said hollow frame and projecting rearwardly therefrom, said connecting plate having a shorter width than the width of said rear plate whereby said rear plate projects laterally beyond the opposite lateral ends of said connecting plate, a U-shaped connecting member on the forward end of said robot wrist, said U-shaped connecting member having a recess defined by a base wall and a pair of legs extending perpendicular to said base wall at the opposite lateral ends thereof, said connecting plate being received in said recess and occupying the entirety thereof with said base wall extending parallel to said connecting plate and said legs bearing against said rear plate on opposite lateral sides of said connecting plate, and bolts extending through said legs for releasably securing said connecting member to said connecting plate.

* * * * *